US008413930B2

(12) United States Patent
Gregory et al.

(10) Patent No.: US 8,413,930 B2
(45) Date of Patent: Apr. 9, 2013

(54) THERMAL ANTI-ICING SYSTEM

(75) Inventors: Karl Gregory, Cowes (GB); Michael James Sheppard, Ryde (GB); Scott Attrill, Bembridge (GB)

(73) Assignee: GKN Aerospace Services Limited, Isle of Wright (GB)

( * ) Notice: Subject to any disclaimer, the term of this patent is extended or adjusted under 35 U.S.C. 154(b) by 0 days.

(21) Appl. No.: 12/529,633

(22) PCT Filed: Mar. 5, 2008

(86) PCT No.: PCT/GB2008/000763
§ 371 (c)(1),
(2), (4) Date: Mar. 4, 2010

(87) PCT Pub. No.: WO2008/107678
PCT Pub. Date: Sep. 12, 2008

(65) Prior Publication Data
US 2010/0163678 A1    Jul. 1, 2010

(30) Foreign Application Priority Data
Mar. 6, 2007    (GB) .................................. 0704316.9

(51) Int. Cl.
*B64D 15/02*    (2006.01)
(52) U.S. Cl.
USPC .................................................... 244/134 B
(58) Field of Classification Search ............... 244/134 R, 244/134 B; 60/39.093; 415/116
See application file for complete search history.

(56) References Cited

U.S. PATENT DOCUMENTS

| 3,933,327 | A | * | 1/1976 | Cook et al. | 244/134 B |
| 3,993,327 | A | | 11/1976 | Cook et al. | |
| 4,674,714 | A | * | 6/1987 | Cole et al. | 244/134 B |
| 4,688,745 | A | * | 8/1987 | Rosenthal | 244/134 R |
| 4,738,416 | A | * | 4/1988 | Birbragher | 244/134 B |
| 5,011,098 | A | * | 4/1991 | McLaren et al. | 244/134 B |

(Continued)

FOREIGN PATENT DOCUMENTS
GB    2 298 241 A    8/1996

OTHER PUBLICATIONS

The International Search Report and Written Opinion as mailed on May 7, 2008 for International Patent Application PCT/GB2008/000763.

(Continued)

*Primary Examiner* — Tien Dinh
(74) *Attorney, Agent, or Firm* — Quarles & Brady LLP

(57) ABSTRACT

An air intake duct of an aircraft engine or other component is provided with a thermal anti-icing system. The front of the air intake duct comprises a toroidal outer skin (16) which forms, with a toroidal internal bulkhead (18), a toroidal plenum (8) about the center line (26). The bulkhead has an inner edge nearest the center line. Within the plenum there is a toroidal inner skin (9) defining with the outer skin a substantially continuous toroidal channel (19). Hot air is supplied via an inlet (7) to the plenum (8). The air flows into an inlet (14) at an end of channel (19) and out of an outlet (11) through the bulkhead (18). This provide more heat to the leading edge of the duct, and to the surface of the duct facing the center line, than to other parts of the duct to prevent build up of ice which may enter, and damage, the engine. This reduces the mass flow of hot air needed for de-icing.

18 Claims, 5 Drawing Sheets

U.S. PATENT DOCUMENTS

| | | | | |
|---|---|---|---|---|
| 5,088,277 | A | * | 2/1992 | Schulze ..................... 60/39.093 |
| 5,944,287 | A | * | 8/1999 | Rodgers .................... 244/134 R |
| 6,457,676 | B1 | * | 10/2002 | Breer et al. ................ 244/134 R |
| 7,673,832 | B2 | * | 3/2010 | Meister ....................... 244/123.1 |
| 2002/0139899 | A1 | * | 10/2002 | Porte ......................... 244/134 B |
| 2008/0149771 | A1 | * | 6/2008 | Zanarelli et al. ........... 244/134 R |

OTHER PUBLICATIONS

IPRP under date of mailing of May 25, 2009 for International Patent Application PCT/GB2008/000248.

* cited by examiner

THERMAL ANTI-ICING SYSTEM

CROSS REFERENCE TO RELATED APPLICATIONS

This application represents the national stage application of International Application PCT/GB2008/000763 filed 05 Mar. 2008, which claims the benefit of Great Britain Patent Application 0704316.9 filed 06 Mar. 2007, which are incorporated herein by reference in their entirety for all purposes.

BACKGROUND OF THE INVENTION

The present invention relates to a thermal anti-icing system for an aircraft engine. Examples of the invention relate to a thermal anti-icing system for an air intake duct. The air intake duct may be for an engine, a cooler of an engine, an aircraft engine for example a gas turbine engine, or a gas turbine engine for other than an aircraft amongst other examples.

U.S. Pat. No. 5,011,098 discloses a thermal anti-icing system for an unducted fan (UDF) engine. The blades of the fan are mounted at the rear of a gas turbine engine outside the engine. If ice forms on the housing or cowling of the engine and separates from the cowling it may damage the fan blades. In order to reduce icing a thermal anti icing system is provided which uses hot air bled from the engine to heat cowling locations subject to significant icing. The cowling has a surface referred to as a skin. The leading edge of the cowling has a space defined by a bulkhead within the cowling and the outer skin of the cowling. Hot air bled from the engine is supplied to a tube of piccolo type inside the space. Part of the skin within the space is provided by a double skin heat exchanger with a plurality of flow passages. The flow passages are spaced apart and extend in the direction of the axis of the gas turbine engine. The spaces between the flow passages are heated by conduction through the material of the skin. The heat exchanger is provided at a location where, if ice is formed and shed from the cowling, there would be a risk of damage to the fan blades; that is over the outer surface of the cowling having an air flow leading to the unducted fan blades. Other parts of the space have a single skin. Hot air from the piccolo tube is caused to flow through the heat exchanger, heating the skin of the cowling more than the single skin parts of the cowling.

U.S. Pat. No. 3,933,327 describes an anti-icing plenum wherein the leading edge of a jet engine nacelle is provided with a structure to prevent the formation of ice particle at the inlet of the jet engine. A leading chamber of the nacelle is formed with a double skin generally facing to the interior towards the jet engine. Hot exhaust gases from the jet engine are passed into spaced channels formed between the inner and outer skins to heat the outer skin from the inside thereof.

SUMMARY OF THE INVENTION

According to one aspect of the present invention, there is provided an air intake duct for use in an aircraft, the duct comprising: a toroidal leading section having a toroidal plenum defined by an outer skin of the duct and an internal bulkhead; an inner skin defining a toroidal air flow channel extending, within the plenum, over a portion of the outer skin thereby defining a double walled skin section of the plenum, the inner skin encompassing a zone of variation of the position of the stagnation point of the airflow over the outer skin over the flight envelope of the aircraft and the plenum having another skin section which is single walled; at least one inlet for supplying hot air to the plenum; at least one inlet extending through the inner skin for supplying the hot air from the plenum to the channel; and at least one outlet for venting air from the channel and plenum; wherein the toroidal air flow channel forms a substantially continuous toroidal air flow space.

An embodiment of the invention can provide for efficient use of a mass flow of hot air needed for heating of the zone of the air intake duct most susceptible to icing.

Heat transfer fins may be attached to the outer skin within the toroidal channel.

The arrangement of the inlet(s) and outlet(s) and the toroidal airflow channel can be configured to provide a balanced airflow in the toroidal channel. Balancing of the airflow in the toroidal channel can providing even heating of the air intake duct over the whole inner surface, within the toroidal channel, of the outer skin of the duct.

The invention also provides an aircraft comprising the air intake duct as set out above.

BRIEF DESCRIPTION OF THE DRAWINGS

For a better understanding of the present invention, reference will now be made by way of example to the accompanying drawings in which.

Figure 2:
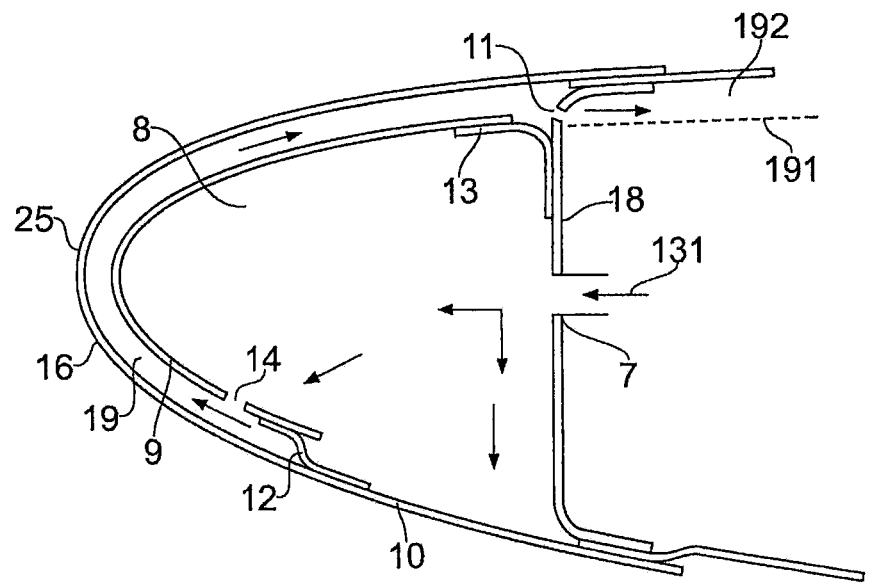
FIG. 2 is an enlarged cross sectional view of the lower part of FIG. 1.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention

DETAILED DESCRIPTION

The following description by way of example refers to an air intake duct of a gas turbine engine of an aircraft, but the invention is not limited only to that example.

Figure 1:
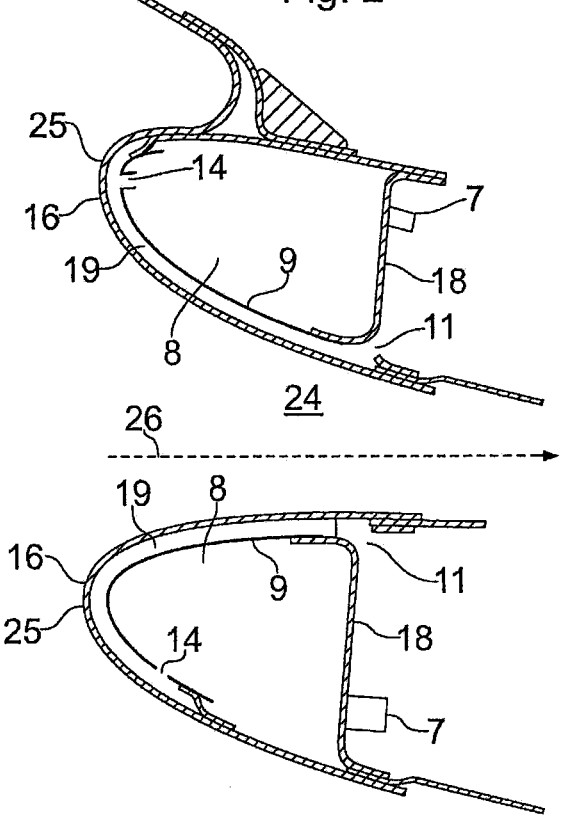
FIG. 1 is a schematic cross sectional view of the front of an air intake duct, according to an embodiment of the invention, of an aircraft engine.
Figure 3:
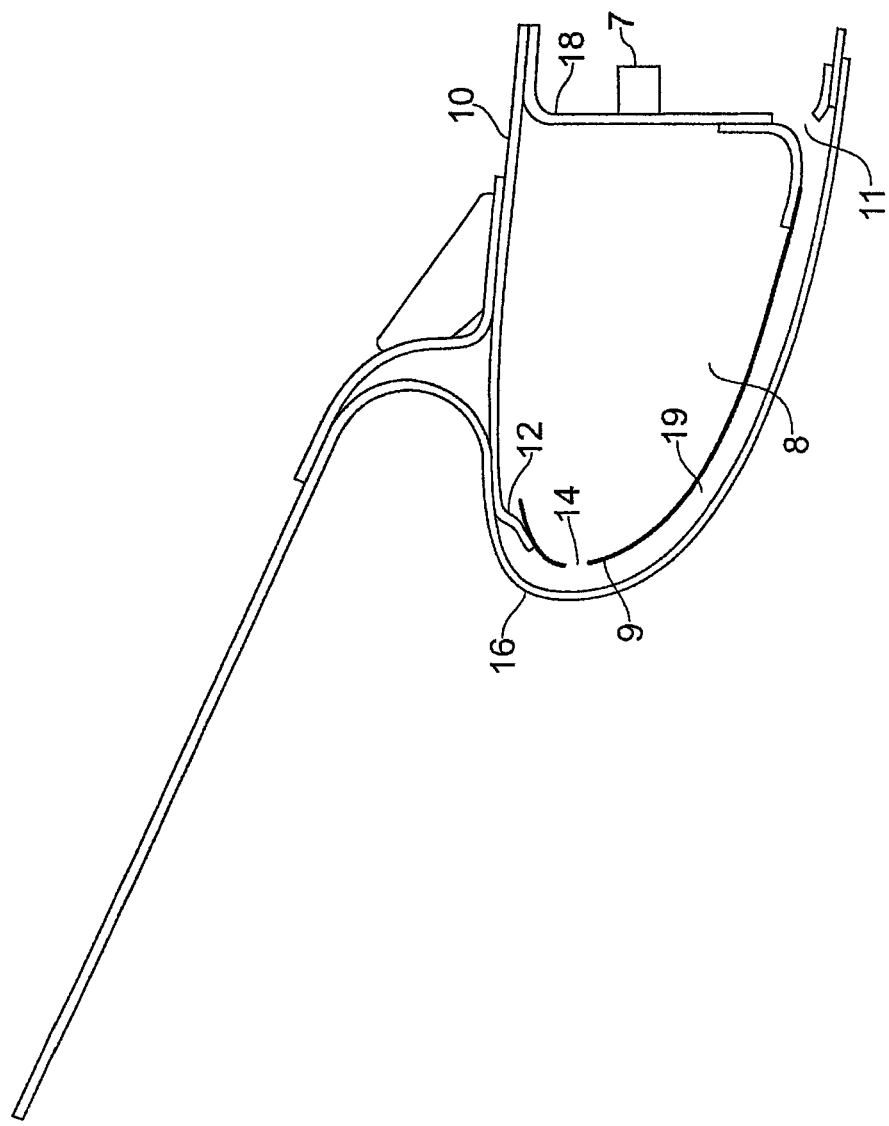
FIG. 3 is an enlarged cross sectional view of the upper part of FIG. 1.
Figure 5:
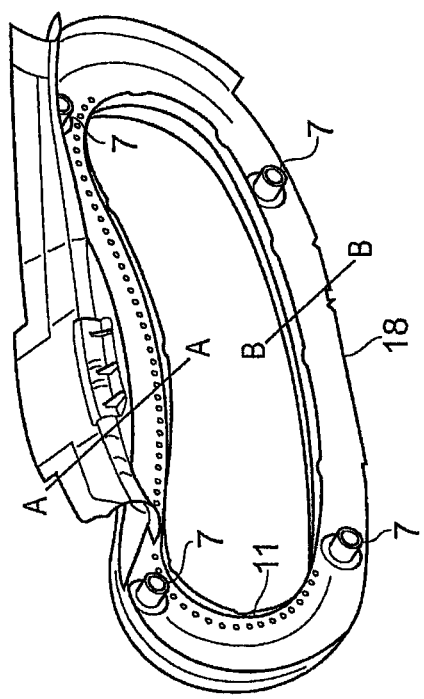
FIG. 5 is a rear perspective view of the duct of FIG. 4.
Figure 4:
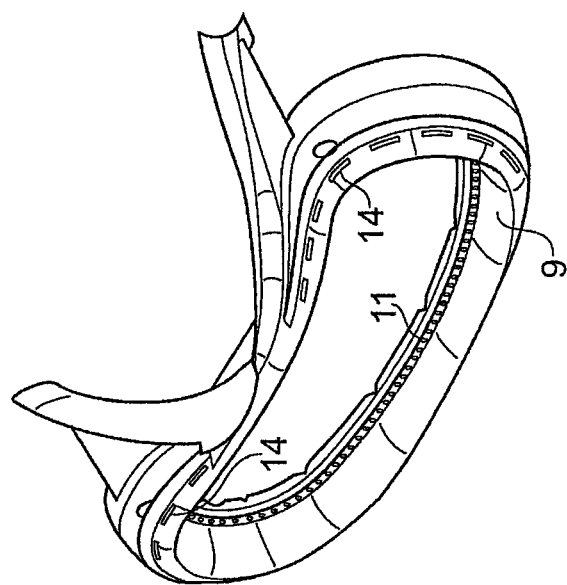
FIG. 4 is a front perspective view of the front of an air intake duct, according to another embodiment of the invention, omitting the outer skin of the duct.

FIG. 1 may be regarded as a cross section on lines A-A and B-B in FIG. 5. FIG. 2 may be regarded as a cross section on line B-B in FIG. 5. FIG. 3 may be regarded as a cross section on line A-A in FIG. 5. FIG. 4 omits the outer skin 16 of the duct.

Referring to FIG. 1, the front of an air intake duct of an aircraft engine is shown. A flow passage 24 has a centre line 26 leading to the engine. The engine is a gas turbine engine for jet propulsion. Alternatively, the gas turbine engine may be for driving a propeller of a propeller aircraft or rotor blades of a helicopter. As shown in FIGS. 4 and 5 the duct surrounds the centre line 26. It may be circular, or of any suitable shape, one example of which is shown in FIGS. 4 and 5.

The example of the duct shown in FIGS. 1 to 6 is provided with a thermal anti-icing system which is arranged to provide more heat to a specific zone of the leading edge of the duct than to other parts of the duct to prevent build up of ice on that specific zone. This reduces the mass flow of hot air needed for de-icing. Bleeding hot air from a gas turbine engine for anti-icing reduces the efficiency of the engine. If ice builds up it may enter, and damage, the engine.

The specific zone, to which more heat is provided in this example of the air intake duct of an aircraft engine, is a zone encompassing the range of variation in position of the stagnation point over the flight envelope of the aircraft.

By way of further explanation, air flowing over the leading edge of the air intake duct divides into a portion entering the duct and a portion flowing outside the duct. The point at which the portions divide is the stagnation point. At that point the flow speed of the air over the surface of the leading edge is zero. Ice tends to build up around the stagnation point. The position of the stagnation point on the leading edge varies according to the attitude or orientation of the aircraft relative to the airflow over the aircraft. It also varies due to the speed of the aircraft and the rotational speed of the turbine machinery. The range of (safe) attitude is the flight envelope of the aircraft.

The front of the air intake duct comprises a toroidal outer skin 16 which forms, with a toroidal internal bulkhead 18, a toroidal plenum 8 about the centre line 26. The bulkhead has an inner edge nearest the centre line. Within the plenum there is a toroidal inner skin 9 defining with the outer skin a toroidal channel 19.

In cross section, the inner skin 9 extends, spaced from and approximately parallel to, the inner surface of the outer skin 16 over a zone extending from the inner edge of the bulkhead 18 towards, and past, the leading edge 25 to a point downstream of the leading edge 25 on the outer side of the duct. Over that zone it defines the air flow channel 19 which is closed at one end by a wall 12 at a point downstream of the leading edge 25 on the outer side of the duct and is open at the other end, passing through an outlet 11 in the bulkhead 18 adjacent to the inner edge of the bulkhead 18. The inner skin 9 has an inlet 14 communicating with the plenum 8. The inlet 14 is adjacent to the wall 12 which closes one end of the channel. Hot air bled from the engine is supplied to the plenum via an inlet 7.

It will be appreciated that, as shown in FIGS. 4 and 5, there are a plurality of inlets 14, outlets 11 and inlets 7 distributed around the toroidal air intake duct.

Hot air bled from the engine by conventional means (not shown) is supplied by conventional means to the plenum through inlets 7. The hot air flows from the plenum into the channel 19 via the inlets 14 in the inner skin 9 adjacent the closed end of the channel and out of the channel via the outlets 11. The plenum has a single skin portion 10 and a double skin portion 9, 19. The channel 19 of the double skin portion provides a greater heating effect over that portion than occurs over the single skin portion 10. The channel 19 causes the mass flow rate of air to be greater within the channel than over the single skin portion 10 of the plenum. The double skin portion is provided where the heating effect is most needed, which in this example is over the zone of the air intake duct encompassing the range of variation of position of the stagnation point over the flight envelope of the aircraft. The double skin portion extends over only a part of the inner surface of the leading face of the plenum, there being the single skin portion 10 outside the range of variation of the position of the stagnation point within the flight envelope of the aircraft.

The channel 19 is defined between the outer skin 16 and the inner skin 9. The inner skin is, fixed to, and supported at one end adjacent the inner side of the air intake duct, by a continuous bracket 13 which connects the inner skin to the bulkhead 18 adjacent the outlets 11. The other end of the inner skin is supported by a continuous bracket 12 which provides the wall 12. The inner skin can be moveable relative to one of the brackets. For example the inner skin can be slidably supported by the bracket 12 to accommodate relative expansion between the inner skin 9 and the bracket 12. This reduces mechanical and thermal stress within the inner skin and the brackets 12 and 13 which support the inner skin.

In the shown example the inner skin is supported only by the continuous brackets 12 and 13. Further supports may be provided intermediate those brackets provided they do not substantially affect the airflow through the channel 19.

Figure 6:
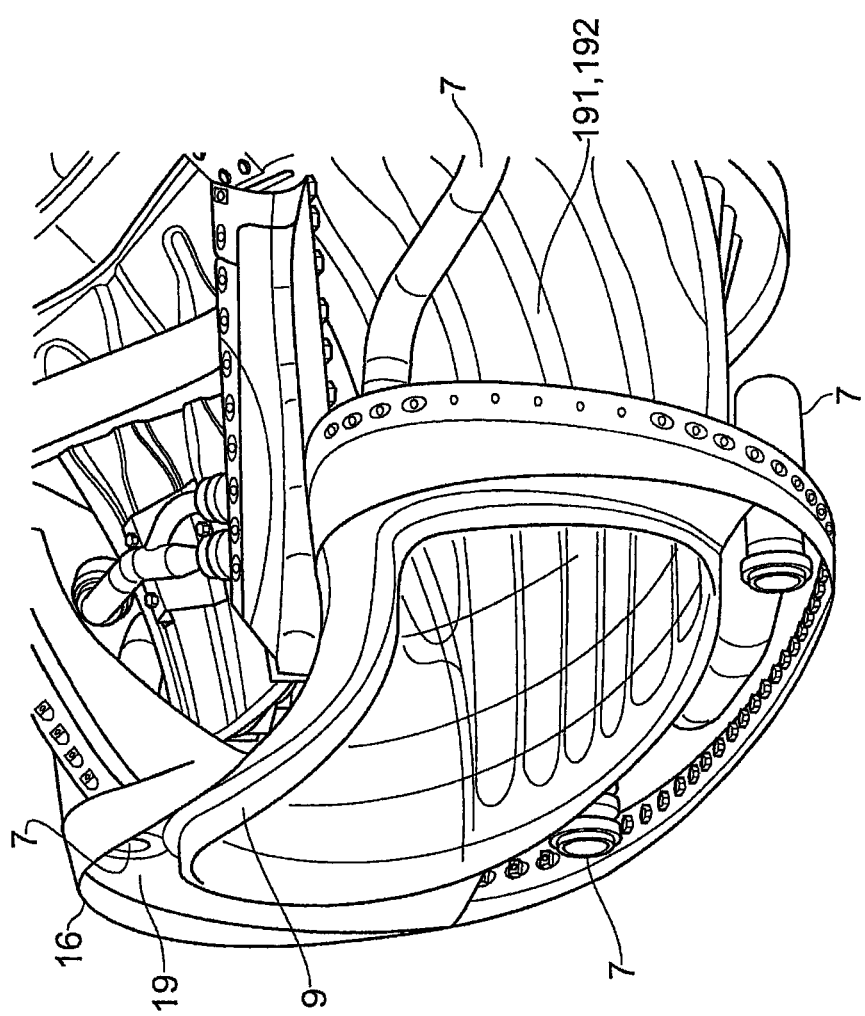
FIG. 6 is a cross-sectional perspective view of the front of the air intake duct.

As best shown in FIG. 6, the channel 19 is a continuous uninterrupted toroidal space. This allows balancing of the airflow through out the channel reducing any variation of heating effect over the leading edge of the air intake duct.

The outlets 11 are shown in FIGS. 1 to 6 as venting the air to the space behind the bulkhead 18. The outlets 11 may vent to the airflow over the outer surface of the duct or as indicated by the dashed line 191 to a channel or channels 192 for heating the outer skin of the air intake duct.

In the example shown in FIGS. 1 to 6, the hot air 131 bled from the engine is delivered to the plenum 8 via pipes connected to four inlets 7 distributed around the plenum. However the hot air could be fed to a piccolo tube within, and extending around, the plenum 8.

The air intake duct described above may be applied to machines other than an aircraft engine. For example the air intake duct may be used as the intake of an oil cooler of an aircraft engine. The air intake duct may be that of a gas turbine engine used for purposes other than propelling an aircraft such as a stationary engine or a propulsion unit of a ship. In that case the variation in position of the stagnation point may not be relevant.

The examples of the duct provide a simple construction which provides enhanced heating where it is needed and reduced heating elsewhere, reducing the amount of air needed to be bled from the gas turbine engine.

Figure 7:
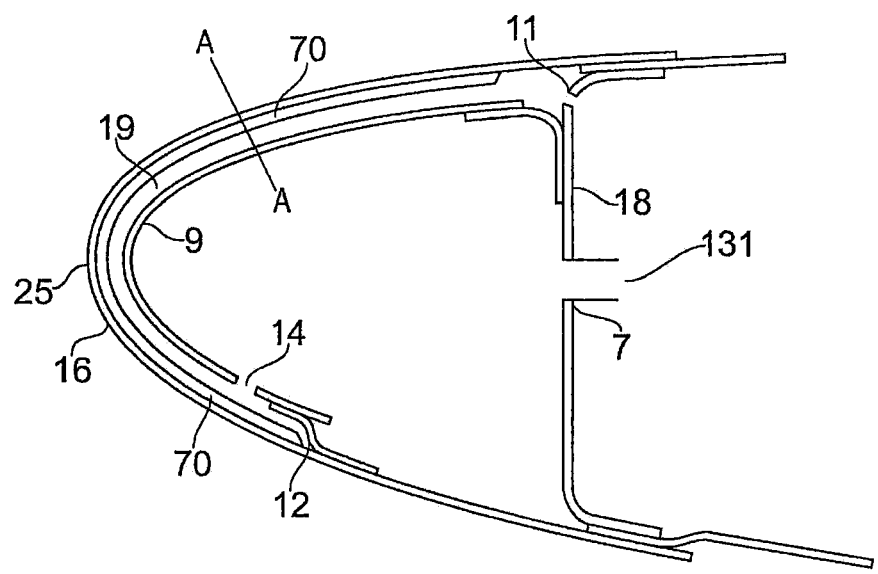
FIG. 7 is a schematic cross sectional view, corresponding to FIG. 2, of a modification of the air intake duct.
Figure 8:
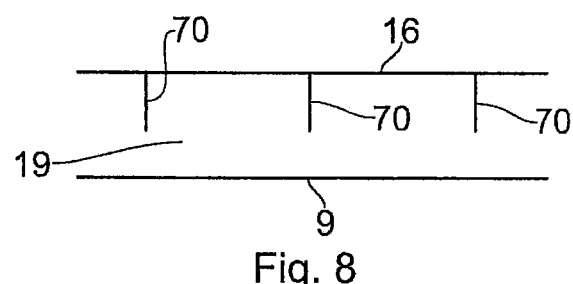
FIG. 8 is a partial view of the cross section taken along line A-A in FIG. 7.

FIGS. 7 and 8 show a modification of the air intake duct of FIGS. 1 to 3 in which heat transfer elements are provided on the outer skin within the toroidal channel 19.

In this example, the heat transfer elements are fins 70 which extend perpendicularly from the outer skin 16 of the toroidal channel 19 towards the inner skin 9 of the channel. The fins 70 are fixed to the outer skin 16 and are spaced from the inner skin 9. The fins are regularly spaced apart along the toroidal channel. As best shown in FIG. 7, and referring also to FIG. 1, each fin extends parallel to the centre line 26 of the air intake duct from adjacent wall 12 at one end of the toroidal channel to adjacent the outlet 11 at the other end of the channel. There is a continuous uninterrupted toroidal space within the channel 19 between the free ends of the fins and the inner skin. The fins 70 provide increased heat transfer to the outer skin compared to the structure of FIGS. 1 to 3.

Figure 9:
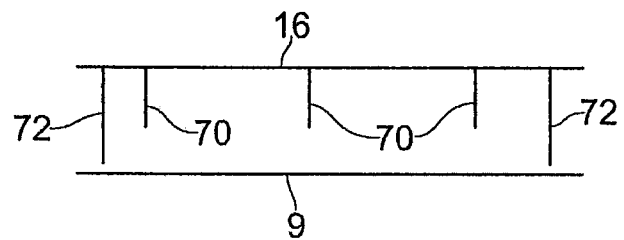
FIG. 9 is a partial cross section, corresponding to FIG. 8, of a modification of the air intake duct of FIGS. 7 and 8.

Referring to FIG. 9, spacers 72 may be provided extending substantially between the inner and outer skins and fixed to the outer skin but not fixed to the inner skin. The spacers 72 are distributed amongst the fins 70. In the example shown in FIG. 9, the spacers 72 are solid walls which partially divide the toroidal channel into discrete sections to reduce air flow circumferentially from one section to the next. In each section, this means than the air then tends to flows from at least one of the inlets 14 to at least one of the outlets 11. Where the plurality of inlets 14 and outlets 11 are distributed around the toroidal channel, balancing of the airflow around the toroidal channel may be achieved.

The spacers can be discontinuous so as to allow tuning of circumferential airflow around the toroidal channel. For example the walls 72 may have airflow passages therethrough. Such airflow passages may be holes or spaces in the walls. Alternatively the spacers may be pillars which are spaced apart. Such a wall or pillar is fixed to only one of the inner and outer skins.

There has been described an embodiment of an air intake duct for use in an aircraft. The duct comprises a toroidal leading section having a toroidal plenum defined by an outer skin of the duct and an internal bulkhead. An inner skin defines a toroidal air flow channel extending, within the plenum, over a portion of the outer skin thereby defining a double walled skin section of the plenum. The plenum also has another skin section that is single walled. Hot air is supplied to the plenum. Hot air is supplied to the channel. Air is vented from the channel and the plenum. The inner skin encompasses the zone of variation of the position of the stagnation point of the airflow over the outer skin over the flight envelope of the aircraft.

In an embodiment, toroidal air flow channel is a substantially continuous toroidal air flow space.

There has been described an embodiment of an air intake duct for use in an aircraft. The duct comprises a toroidal leading section having a toroidal plenum defined by an outer skin of the duct and an internal bulkhead. An inner skin defines a toroidal air flow channel extending, within the plenum, over a portion of the outer skin thereby defining a double walled skin section of the plenum. The plenum has another skin section that is single walled. Hot air is supplied to the plenum. Hot air is supplied to the channel. Air is vented from the channel and plenum. The arrangement of the toroidal airflow channel and the inlets and outlets provides balanced airflow in the toroidal channel.

Various features can be provided in one or more embodiments, either in separate embodiments or combined in one embodiment.

For example, hot air can be supplied to the plenum via one or more inlets. The hot air can be supplied to the channel via one or more inlets, for example from the plenum. One or more outlets can vent air from the channel and the plenum, for example to the exterior of the duct and/or to further channels of the duct.

In an example embodiment, the inner skin defining the toroidal air flow channel can extend, within the plenum, over the outer skin from a toroidally inner edge of the bulkhead at one end of the channel upstream to, and past, the leading edge of the duct, and then downstream to the other end of the channel at which the channel is closed. A plurality of inlets can be distributed over, and extend through, the bulkhead for supplying hot air to the plenum. A plurality of inlets can be distributed over, and extending through, the inner skin for supplying the hot air from the plenum to the channel, for example adjacent the closed end of the channel. A plurality of outlets can be distributed around, and extend through, the bulkhead, for example at the inner edge thereof.

In embodiments, one end of the inner skin can be supported by a first support and another end can be supported by a second support, the inner skin being moveable relative to one of the supports, for example to reduce mechanical and thermal stress therein. The inner skin can, for example, be slidably supported by one of the supports.

Heat transfer elements can be attached to the outer skin within the double walled skin section. The heat transfer elements can be fins attached to the outer skin within the double walled skin section. Spacers can be provided that extend substantially between the inner and outer skins.

In an embodiment the toroidal channel is a substantially continuous toroidal air flow space. However, the toroidal channel can be substantially divided into discrete sections, each of which provides an air flow channel from at least one of the inlets to a corresponding at least one of the outlets. Spacers between the inner and outer skins can allow airflow circumferentially around the toroidal channel. The spacers can, for example, be spaced-apart pillars; spaced-apart walls; or walls having airflow passages therethrough.

The outlets can vent air to the exterior of the duct, or to further channels of the duct.

In one example, the inner skin defining the toroidal air flow channel can extend, within the plenum, over the outer skin from a toroidally inner edge of the bulkhead at one end of the channel upstream to, and past, the leading edge of the duct, and then downstream to the other end of the channel at which the channel is closed. A plurality of inlets can be distributed over, and extend through, the bulkhead for supplying hot air to the plenum. A plurality of inlets can be distributed over, and extend through, the inner skin for supplying hot air from the plenum to the channel adjacent the closed end of the channel. A plurality of outlets can be distributed around, and extend through, the bulkhead at the inner edge thereof.

The various individual features of the embodiments of an air intake duct described herein can be combined as appropriate. The air intake duct can be, for example an air intake duct of a propulsion engine of an aircraft, for example a gas turbine engine. The air intake duct can, for example, be a cooler of an aircraft. The hot air can be hot air from a propulsion unit of an aircraft. Although the embodiments above have been described in considerable detail, numerous variations and modifications will become apparent to those skilled in the art once the above disclosure is fully appreciated.

The invention claimed is:

1. An air intake duct for use in an aircraft, the duct comprising:
    a toroidal leading section having a toroidal plenum defined by an outer skin of the duct and an internal bulkhead;
    an inner skin defining a toroidal air flow channel extending, within the plenum, over a portion of the outer skin thereby defining a double walled skin section of the plenum, the inner skin encompassing a zone of variation of the position of the stagnation point of the airflow over the outer skin over the flight envelope of the aircraft and the plenum having another skin section which is single walled;
    an inlet for supplying hot air to the plenum;
    an inlet for supplying the hot air to the channel; and
    an outlet for venting air;
    wherein the toroidal air flow channel forms a substantially continuous toroidal air flow space and wherein one end of the inner skin is supported by a first support and another end is supported by a second support, the inner skin being moveable relative to one of the supports.

2. The duct of claim 1, comprising a plurality of inlets distributed over, and extending through, the inner skin for supplying the hot air from the plenum to the channel.

3. The duct of claim 1, comprising a plurality of outlets, for venting air from the channel and the plenum.

4. The duct of claim 3, wherein the outlets vent air to the exterior of the duct.

5. The duct of claim 3, wherein the outlets vent air to further channels of the duct.

6. The duct of claim 1, wherein
the inner skin extends, within the plenum, over the outer skin from a toroidally inner edge of the bulkhead at one end of the channel upstream to, and past, a leading edge of the duct, and then downstream to the other end of the channel at which the channel is closed,
the inlet for supplying hot air to the plenum includes a plurality of inlets that are distributed over, and extend through, the bulkhead for supplying hot air to the plenum;
the inlet for supplying the hot air to the channel includes a plurality of inlets that are distributed over, and extend through, the inner skin for supplying hot air from the plenum to the channel adjacent the closed end of the channel; and
the outlet for venting air includes a plurality of outlets that are distributed around, and extend through, the bulkhead at the inner edge thereof.

7. The duct of claim 1, wherein the inner skin is slidably supported by one of the supports.

8. The duct of claim 1 comprising heat transfer elements attached to the outer skin within the double walled skin section, the heat transfer elements being spaced from the inner skin.

9. The duct of claim 8, wherein the heat transfer elements are fins attached to the outer skin within the double walled skin section.

10. The duct of claim 1, wherein the arrangement of the toroidal airflow channel and the inlets and outlets provides balanced airflow in the toroidal channel.

11. The duct of claim 1, further comprising spacers attached to one of the outer skin and the inner skin within the double walled skin section, the spacers comprising one or more of spaced-apart pillars, spaced-apart walls, or walls having airflow passages therethrough to allow airflow to pass around the toroidal channel.

12. An aircraft comprising an air intake duct, the air intake duct comprising:
a toroidal leading section having a toroidal plenum defined by an outer skin of the duct and an internal bulkhead;
an inner skin defining a toroidal air flow channel extending, within the plenum, over a portion of the outer skin thereby defining a double walled skin section of the plenum, the inner skin encompassing a zone of variation of the position of the stagnation point of the airflow over the outer skin over the flight envelope of the aircraft and the plenum having another skin section which is single walled;
an inlet for supplying hot air to the plenum;
an inlet for supplying the hot air to the channel; and
an outlet for venting air;
wherein the toroidal air flow channel forms a substantially continuous toroidal air flow space and wherein one end of the inner skin is supported by a first support and another end is supported by a second support, the inner skin being moveable relative to one of the supports.

13. The aircraft of claim 12, wherein the air intake duct is that of a propulsion engine of the aircraft.

14. The aircraft of claim 13, wherein the engine is a gas turbine engine.

15. The aircraft of claim 14, wherein the air intake duct is that of a cooler.

16. The aircraft of claim 12, wherein the inlet to the plenum is connected to the engine to receive hot air therefrom.

17. The aircraft as claimed in claim 12 comprising heat transfer elements attached to the outer skin within the double walled skin section, the heat transfer elements being spaced from the inner skin.

18. The aircraft of claim 12, further comprising spacers attached to one of the outer skin and the inner skin within the double walled skin section, the spacers comprising one or more of spaced-apart pillars, spaced-apart walls, or walls having airflow passages therethrough to allow airflow to pass around the toroidal channel.

* * * * *

UNITED STATES PATENT AND TRADEMARK OFFICE
CERTIFICATE OF CORRECTION

PATENT NO. : 8,413,930 B2
APPLICATION NO. : 12/529633
DATED : April 9, 2013
INVENTOR(S) : Gregory et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this

First Day of September, 2015

Michelle K. Lee
*Director of the United States Patent and Trademark Office*